(12) United States Patent
Liu et al.

(10) Patent No.: US 8,512,090 B2
(45) Date of Patent: Aug. 20, 2013

(54) METHOD FOR MAKING FIELD EMISSION CATHODE DEVICE

(71) Applicants: Tsinghua University, Beijing (CN); Hon Hai Precision Industry Co., Ltd., New Taipei (TW)

(72) Inventors: Peng Liu, Beijing (CN); Hai-Yan Hao, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/754,867

(22) Filed: Jan. 30, 2013

(65) Prior Publication Data

US 2013/0143465 A1 Jun. 6, 2013

Related U.S. Application Data

(63) Continuation of application No. 13/076,914, filed on Mar. 31, 2011, now Pat. No. 8,400,052.

(30) Foreign Application Priority Data

Dec. 24, 2010 (CN) .......................... 2010 1 0604389

(51) Int. Cl.
*H01J 9/02* (2006.01)
*H01J 9/04* (2006.01)

(52) U.S. Cl.
USPC ................. 445/51; 445/49; 445/50; 313/309; 313/310

(58) Field of Classification Search
USPC ................................................ 445/49, 50, 51
See application file for complete search history.

(56) References Cited

U.S. PATENT DOCUMENTS 7,993,703 B2 * 8/2011 Goislard De Monsabert et al. ........................... 427/249.9
8,030,837 B2 * 10/2011 Hao et al. ...................... 313/495

\* cited by examiner

*Primary Examiner* — Sikha Roy
(74) *Attorney, Agent, or Firm* — Altis Law Group, Inc.

(57) ABSTRACT

A method for making a field emission cathode device is provided. A filler, a substrate, and a metal plate are provided. The metal plate has a first surface and a second surface opposite to the first surface, and defines at least one through hole extending through from the first surface to the second surface. At least one electron emitter is inserted into the at least one through hole. The first surface of the metal plate is attached to the substrate. At least a part of the at least one electron emitter is located between the first surface and the substrate. The at least one through hole is filled with the filler to firmly fix the at least one electron emitter.

20 Claims, 6 Drawing Sheets

METHOD FOR MAKING FIELD EMISSION CATHODE DEVICE

RELATED APPLICATIONS

This application is a continuation application of U.S. patent application Ser. No. 13/076914, filed on Mar. 31, 2011, and entitled, "FIELD EMISSION CATHODE DEVICE AND METHOD FOR MAKING THE SAME," which claims all benefits accruing under 35 U.S.C. §119 from China Patent Application No. 201010604389.2, filed on Dec. 24, 2010 in the China Intellectual Property Office, the contents of which are hereby incorporated by reference.

BACKGROUND

1. Technical Field

The present disclosure relates to a field emission cathode device and a method for making the same.

2. Description of Related Art

Field emission displays (FEDs) are a new, rapidly developing flat panel display technology. Generally, FEDs can be roughly classified into diode and triode structures. In particular, carbon nanotube-based FEDs have attracted much attention in recent years.

Field emission cathode devices are important elements in FEDs. A method for making field emission cathode device usually includes the steps of: providing an insulating substrate; forming a cathode electrode on the substrate; forming a dielectric layer on the cathode electrode; and depositing a plurality of carbon nanotubes on the exposed cathode electrode as the electron emitter. However, the carbon nanotubes fabricated by the CVD method are not secured on the cathode electrode. The carbon nanotubes are prone to be pulled out from the cathode electrode by a strong electric field force, thus causing the field emission cathode device to have a short lifespan.

What is needed, therefore, is a field emission cathode device that can overcome the above-described shortcomings and a method for making the same.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
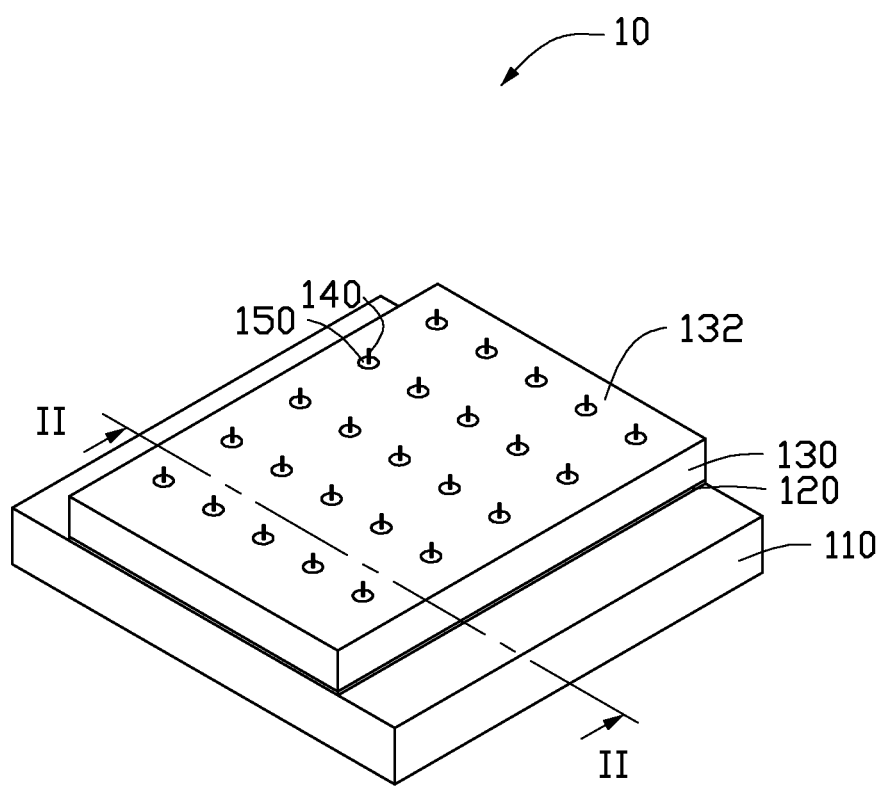
FIG. 1 is a schematic view of one embodiment of a field emission cathode device.
Figure 2:
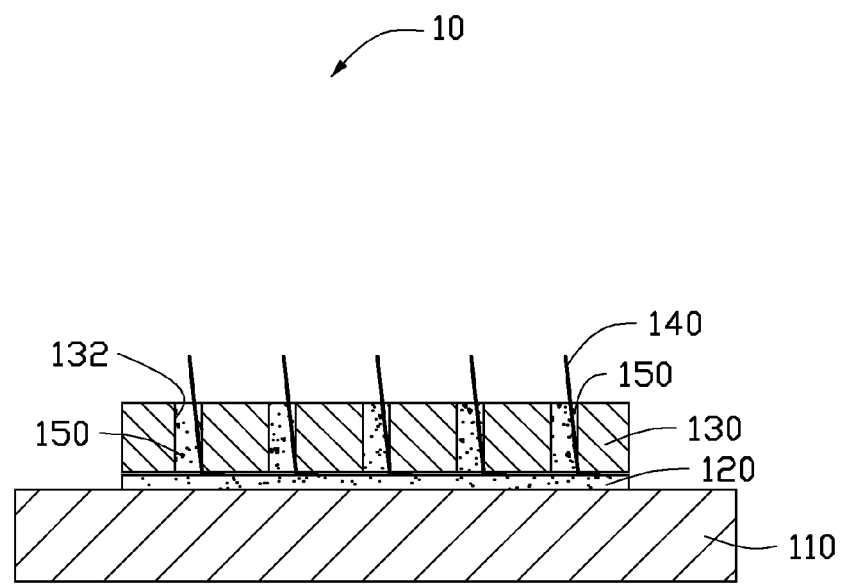
FIG. 2 is a schematic, cross-sectional view, along a line II-II of FIG. 1.

Referring to FIG. 1 and FIG. 2, a field emission cathode device 10 of one embodiment includes a substrate 110, a metal plate 130 and a plurality of electron emitters 140. The metal plate 130 is located on a surface of the substrate 110. The metal plate 130 defines a plurality of through holes 132. At least one electron emitter 140 is located in each of the through holes 132.

The material of the substrate 110 can be insulative material, conductive material, or semiconductor material. The insulative material can be glass, ceramic, plastic or polymer materials, to ensure that the substrate 110 has a fixed shape and a certain mechanical strength. The conductive material can be gold, silver, copper, aluminum, or any alloy of the metal mentioned. The semiconductor material can be silicon. A shape and a thickness of the substrate 110 can be chosen according to actual need. The shape of the substrate 110 can be square or rectangular with a thickness greater than 15 micrometers.

Figure 3:
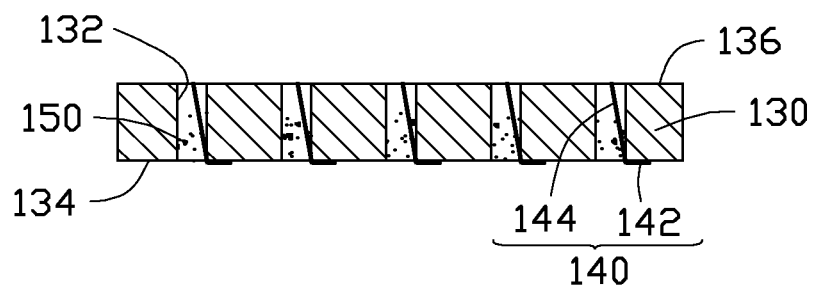
FIG. 3 is a schematic view of one embodiment of an electron emitter and a metal plate.

Referring to FIG. 3, in one embodiment, each through hole 132 has a single electron emitter 140 located therein. The metal plate 130 has a first surface 134 and a second surface 136 opposite to the first surface 134. The first surface 134 is attached to the substrate 110 by an adhesive layer 120. A material of the adhesive layer 120 can be a heat-resistant adhesive such as epoxy adhesives. The adhesive layer 120 can be tightly adhered to both the metal plate 130 and the substrate 110.

The material of the metal plate 130 can be gold, silver, copper, aluminum, or any alloy of the metal mentioned. A shape and a thickness of the metal plate 130 can be chosen according to need. For example, the shape of the metal plate 130 can be square or rectangular with a thickness greater than 15 micrometers. In one embodiment, the material of the metal plate 130 is copper, and the shape of the metal plate is square with a side length of about 50 millimeters and a thickness of about 1 millimeter.

The metal plate 130 has many advantages. For example, the metal is easy to process and form an opening, and has good heat conductivity, thus the metal plate 130 in the field emission cathode device 100 can effectively reduce the process cost. The metal plate 130 can also improve the heat dissipation of the electron emitter 140 in application.

The through holes 132 can be arranged in an array or a certain pattern. The cross section of each through hole 132 can be round, rectangular, square, etc. In one embodiment, the cross section of the through hole 132 is circular with a diameter in a range from about 3 micrometers to about 1000 micrometers.

Furthermore, the through hole 132 can be filled with a filler 150. The material of the filler 150 is a thermal conductive material such as tin. The filler 150 is used to fix the electron emitter 140 and improve the heat conductivity between the electron emitter 140 and the metal plate 130.

The electron emitter 140 can extend out of the through hole 132. Referring to FIG. 3, the electron emitter 140 does not extend out of the through hole 132. The electron emitter 140 includes a first portion 142 and a second portion 144. The first portion 142 of the electron emitter 140 is fixed between the first surface 134 and the substrate 110. The length of the first portion 142 can be selected according to need as long as at least part of the sidewall of the first portion 142 is in contact with the first surface 134.

The second portion 144 of the emitter 110 is received in the through hole 132 and extends away from the first surface 134 and the substrate 110. The second portion 144 can be substantially perpendicular to the first surface 134 and the second surface 136. The second portion 144 can be used as an electron emission portion.

The filler 150 covers at least part surface of the electron emitter 140, and the electron emission portion is exposed from the filler 150. The end surface of the electron emission portion and the second surface 136 can be at the same plane. The filler 150 can fill part of the through hole 132 to ensure that the electron emission portion is exposed from the filler 150. The electron emitter 140 can be spaced from the side wall of the through hole 132. The metal plate 130 does not shield the electron emission and ensures that the electron emission portion can emit electron in the electric field.

Figure 4:
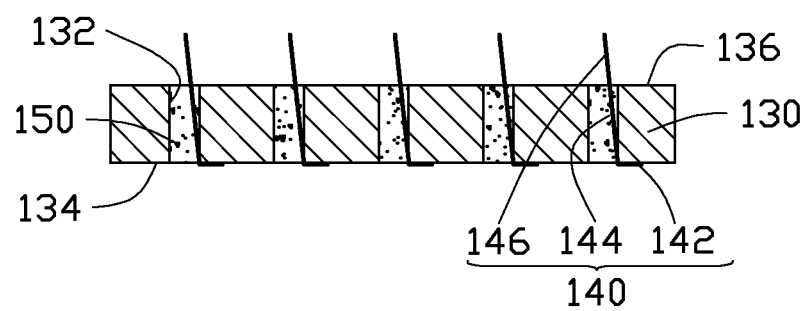
FIG. 4 is a schematic view of another embodiment of an electron emitter and a metal plate.

Referring to FIG. 4, the electron emitter 140 can further include a third portion 146 located out of the through hole 132 extending above the second surface 136. The filler 150 can fill part of the through hole 132 or fill the entire through hole 132. In the illustrated embodiment, there is only one electron emitter 140 received in each through hole 132. The first portion 142, the second portion 144 and the third portion 146 are connected in sequence forming an integrated structure. The third portion 146 is now the electron emission portion. In one embodiment, the length of the first portion 142 is twice the length of the second portion 144.

Figure 5:
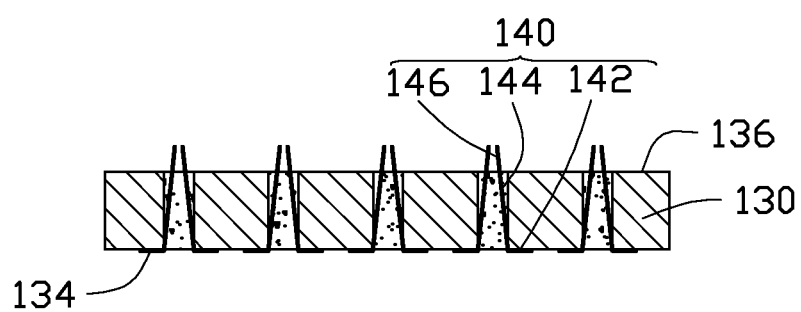
FIG. 5 is a cross-sectional view of one embodiment of a field emission cathode device having a plurality of electron emitters located in each through hole.

Referring to FIG. 5, a plurality of electron emitters 140 can be received in each through hole 132. If a plurality of electron emitters 140 is received in one through hole 132, the electron emitters 140 can be spaced from each other or partly in contact with an adjacent electron emitter 140. In one embodiment, two electron emitters 140 are received in each through hole 132, and the electron emission portion of each electron emitter 140 is spaced from each other to reduce the shielding effect.

The electron emitter 140 should be flexible and free standing. The electron emitter 140 can be a linear carbon nanotube structure, a carbon fiber, or a silicon nanowire. The electron emitter 140 can be located substantially parallel or twisted with at least one supporting wire, such as helically around an axial direction of the supporting wire. A diameter of the supporting wire can range from about 50 micrometers to about 500 micrometers. The supporting wire can be metal wire such as copper wire, aluminum wire, silver wire, molybdenum wire, or gold wire. The supporting wire is used to support the electron emitter 140 so that it has a good free standing property.

In one embodiment, the electron emitter 140 is a linear carbon nanotube structure. The linear carbon nanotube structure can include at least one carbon nanotube wire and/or at least one carbon nanotube cable. A carbon nanotube cable includes a plurality of carbon nanotube wires. The carbon nanotube wires in the carbon nanotube cable can be twisted or untwisted. In an untwisted carbon nanotube cable, the carbon nanotube wires are substantially parallel with each other. In a twisted carbon nanotube cable, the carbon nanotube wires are twisted with each other. A diameter of the linear carbon nanotube structure can range from about 1 micrometer to about 500 micrometers. In one embodiment, the diameter of the linear carbon nanotube structure is 50 micrometers.

The untwisted carbon nanotube wire can be obtained by treating a drawn carbon nanotube film drawn from a carbon nanotube array with a volatile organic solvent. Examples of drawn carbon nanotube film, also known as carbon nanotube yarn, or nanofiber yarn, ribbon, and sheet are taught by U.S. Pat. No. 7,045,108 to Jiang et al., and WO 2007015710 to Zhang et al. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be pulled together to form the untwisted carbon nanotube wire. The untwisted carbon nanotube wire includes a plurality of carbon nanotubes substantially oriented along a same direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire can range from about 0.5 nanometers to about 100 micrometers. Examples of carbon nanotube wire are taught by US PGPub. 20070166223A1 to Jiang et al.

The twisted carbon nanotube wire can be formed by twisting the drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes substantially parallel to each other, and joined by van der Waals attractive force therebetween. The length of the carbon nanotube wire can be set as desired. A diameter of the twisted carbon nanotube wire can be from about 0.5 nanometers to about 100 micrometers. Further, the twisted carbon nanotube wire can be treated with a volatile organic solvent after being twisted. After being soaked by the organic solvent, the adjacent paralleled carbon nanotubes in the twisted carbon nanotube wire will bundle together. The specific surface area of the twisted carbon nanotube wire will decrease, while the density and strength of the twisted carbon nanotube wire will increase. The carbon nanotubes in the carbon nanotube wire can be single-walled, double-walled, or multi-walled carbon nanotubes.

In the field emission cathode device 10, at least part of the electron emitter 140 is fixed between the metal plate 130 and the substrate 110, such that the electron emitter 140 can be firmly fixed in the field emission cathode device. Thus, the electron emitter 140 is secured and cannot be pulled out from the metal plate 130 by an electric field force in a strong electric field. Therefore, the field emission cathode device 100 has a long life.

Figure 6:
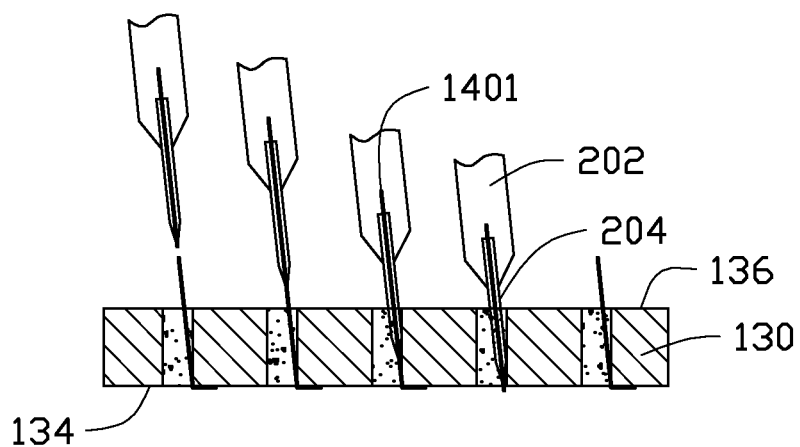
FIG. 6 is a schematic view of one embodiment of a method for making a field emission cathode device.

Referring to FIG. 6, one embodiment of a method for making the field emission cathode device 100 is provided. The method can include:

(S10) providing the metal plate 130, the substrate 110, the filler 150;

(S20) inserting at least one electron emitter 140 into each through hole 132, and attaching a first end portion 142 of the electron emitter 140 on the first surface 134;

(S30) attaching the metal plate 130 to the substrate, such that the first end portion 142 of the electron emitter 140 is sandwiched between the metal plate 130 and the substrate 110; and (S40) filling the through hole 132 with the filler 150 to firmly fix the electron emitter 140 in the through hole 132.

In step (S20), the method of inserting at least one electron emitter 140 in each through hole 132 can further include:

(S21) providing a field emission wire supply device supplying a continuous field emission wire 1401, the field emission wire supply device including a hollow needle 202 and a tip 204, wherein the field emission wire 1401 extends through the hollow needle 202 and out from the tip 204;

(S22) inserting the field emission wire 1401 into one through hole 132, and severing the field emission wire 1401 to obtain at least one electron emitter 140;

(S23) repeating the steps (S21) and (S22) until at least one emitter 110 is in each through hole 132, if more than one through hole 132.

In step (S21), the inner diameter of the hollow needle 202 can be selected according to the diameter of the field emission wire 1401, and an outer diameter of the hollow needle 202 can be selected according to the diameter of the through hole 132. The inner diameter of the hollow needle 202 can be about 5 times to about 10 times the diameter of the field emission wire 1401, to reduce friction between the field emission wire 1401 and the hollow needle 202. The field emission wire 1401 can extend out from the tip 204 continuously. The field emission wire supply device 200 can further include a robot arm (not shown), a control computer (not shown), and other auxiliary equipment to automate production. In one embodiment, the field emission wire 1401 is a linear carbon nanotube structure cut to form a plurality of electron emitters 140.

In step (S22), the method of inserting the field emission wire 1401 into the through hole 132 includes:

(S221) moving the hollow needle 202, inserting the hollow needle 202 into the through hole 132 from the second surface 136 to the first surface 134, and supplying the field emission wire 1401 at the same time;

(S222) fixing the end of the field emission wire 1401 extending out from the tip 204 on the first surface 134, such as by a welding or bonding method;

(S223) pulling the hollow needle 202 out of the second surface 136 through the through hole 132; and (S224) severing the field emission wire 1401 to obtain the electron emitter 140.

The field emission wire 1401 is then severed to form the electron emitter 140. The field emission wire 1401 can be severed immediately after the field emission wire 1401 is pulled out of the second surface 136 so that the severed end of the field emission wire 1401 and the second surface 136 are substantially coplanar. Thus, the electron emission portion of the electron emitter 140 and the second surface 136 are substantially coplanar. The field emission wire 1401 can also be severed after it is pulled out of the second surface 136 certain distance to form the electron emitter 140. In this situation, the electron emission portion extends out of the through hole 132 and above the second surface 136. In one embodiment, the length of the electron emitters 140 extending out of the through hole 132 and above the second surface 136 are substantially the same.

In step (S224), the field emission wire 1401 can be cut by a method of mechanical cutting such as a blade, laser scanning, electron beam irradiation, ion beam irradiation, heating by supplying a current, and/or laser-assisted fusing after supplying current.

In step (S30), the method of attaching the metal plate 130 to the substrate 110 includes:

(S31) coating a surface of the substrate 110 with a binder, thereby forming a bonding layer 140; and (S32) attaching the first surface 134 of the metal plate 130 to the surface of the substrate 110 with the binder.

In step (S31), the binder can be epoxy adhesives.

In step (S32), because the first surface 134 has a part of the electron emitter 140 thereon, the electron emitter 140 is firmly held between the metal plate 130 and the substrate 110.

In step (S40), the filler 150 can be melted and filled into the through hole 132 with a tool such as a hollow needle. The depth of the filler 150 in the through hole 132 can be chosen according to need, so long as the electron emission portion of the electron emitter 140 can be exposed from the filler 150 to emit electrons. In one embodiment, the filler 150 is filled entirely in the through hole 132. In the filling process, the electron emitter 140 should be kept in the centre of the through hole 132, to ensure the filler 150 is uniformly distributed around the sidewalls of the electron emitter 140. Therefore, the contact area between the electron emitter 140 and the filler 150 can be improved, and accordingly, the thermal capacity improved. Thus, heat produced by the electron emitter 140 can be effectively conducted to the surrounding. Further more, the electron emitter 140 can withstand a strong electric field force.

Furthermore, the method of making the field emission cathode device 100 can further include a step of burning the electron emitter 140. The electron emission portion of the electron emitter 140 which extends out of the through hole 132 and above the second surface 136 can be burned using a flame such as an alcohol lamp. Thus, one part of the electron emitter 140 far away from the metal plate 130 is burned down, but another part of the electron emitter 140 close to the metal plate 130 is left due to a high heat conductivity of the electron emitter 140. A length of the remainder portion of the electron emitter 140 after burning depends on many factors such as oxidative atmosphere, temperature of flame, diameter of the electron emitter 140, and the conductivity of the metal plate 130. The temperature of the flame can be about 400° C. to about 900° C. In one embodiment, the oxidative atmosphere is air, the diameter of the electron emitter 140 is about 50 μm, the temperature of the flame is about 450° C., the metal plate 130 is a copper plate, and the length of the remainder portion of the electron emitter 140 is about 0.5 millimeters. After the electron emitter 140 is burned, the stability of the field emission can be improved. Furthermore, the field emission uniformity can be improved due to the remainder portion of the electron emitters 140 having the same length.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A method for making a field emission cathode device, the method comprising:
   step (S10), providing a filler, a substrate, and a metal plate, wherein the metal plate has a first surface and a second surface opposite to the first surface, and defines at least one through hole extending through from the first surface to the second surface;
   step (S20), inserting at least one electron emitter into the at least one through hole;
   step (S30), attaching the first surface of the metal plate to the substrate, wherein at least a part of the at least one electron emitter is located between the first surface and the substrate; and
   step (S40), filling the at least one through hole with the filler to firmly fix the at least one electron emitter.

2. The method of claim 1, wherein the step (S20) comprises:
   step (S21), providing a field emission wire supply device supplying a continuous field emission wire, the field emission wire supply device having a hollow needle and a tip, wherein the field emission wire extends through the hollow needle and out from the tip;
   step (S22), positioning the field emission wire into the at least one through hole, and severing the field emission wire to obtain at least one electron emitter;
   step (S23), repeating the steps (S21) and (S22) if the at least one through hole is a plurality of through holes so that each of the through holes has at least one electron emitter.

3. The method of claim 2, wherein the step (S22) comprises:
   step (S221), inserting the hollow needle into the at least one through hole and supplying the field emission wire at the same time;
   step (S222), fixing the end of the field emission wire extending out from the tip on the first surface;
   step (S223), pulling the hollow needle out of the second surface through the at least one through hole; and
   step (S224), severing the field emission wire to obtain the at least one electron emitter.

4. The method of claim 2, wherein the step of severing the field emission comprises mechanical cutting, laser scanning, electron beam irradiation, ion beam irradiation, heating by supplying a current, or laser-assisted fusing after supplying current.

5. The method of claim 2, wherein a plurality of electron emitters is inserted into a plurality of through holes, and the plurality of electron emitters have the same length.

6. The method of claim 1, further comprising a step of burning an end of the at least one electron emitter extending out of the at least one through hole and above the second surface after the step (S20).

7. The method of claim 6, wherein a plurality of electron emitters is inserted into a plurality of through holes, and remainder portions of the plurality of electron emitters have approximately the same length.

8. The method of claim 6, wherein a burning temperature is in a range from about 450° C. to about 900° C.

9. The method of claim 6, wherein the step of burning is performed by using a flame.

10. The method of claim 1, wherein the at least one electron emitter is flexible and free standing.

11. The method of claim 1, wherein the at least one electron emitter is a linear carbon nanotube structure, a carbon fiber, or a silicon nanowire.

12. The method of claim 1, wherein the at least one electron emitter is a linear carbon nanotube structure having a plurality of carbon nanotubes substantially parallel to each other and joined by van der Waals attractive force therebetween.

13. The method of claim 1, wherein the inserting the at least one electron emitter into the at least one through hole comprising extending an electron emission portion of each of the at least one electron emitter out of the at least one through hole.

14. The method of claim 1, wherein the attaching the first surface of the metal plate to the substrate comprises fixing the first surface of the metal plate on the substrate by an adhesive layer.

15. A method for making a field emission cathode device, the method comprising:
   providing a metal plate, wherein the metal plate has a first surface and a second surface opposite to the first surface, and defines at least one through hole extending through from the first surface to the second surface;
   inserting at least two electron emitters into each of the at least one through hole;
   attaching the first surface of the metal plate to a substrate, wherein at least a part of each of the at least two electron emitters is located between the first surface and the substrate; and
   filling the at least one through hole with a filler.

16. The method of claim 15, wherein the at least two electron emitters are flexible and free standing.

17. The method of claim 15, wherein each of the at least two electron emitters is a linear carbon nanotube structure, a carbon fiber, or a silicon nanowire.

18. The method of claim 15, wherein each of the at least two electron emitters is a linear carbon nanotube structure having a plurality of carbon nanotubes substantially parallel to each other and joined by van der Waals attractive force therebetween.

19. The method of claim 15, wherein the inserting at least two electron emitters into each of the at least one through hole comprises extending an electron emission portion of each of the at least two electron emitters out of the at least one through hole.

20. The method of claim 19, wherein electron emission portions of the at least two electron emitters are spaced from each other.

* * * * *